United States Patent [19]

Kwon

[11] Patent Number: 5,525,997
[45] Date of Patent: Jun. 11, 1996

[54] SELF-CALIBRATING, EIGENSTRUCTURE BASED METHOD AND MEANS OF DIRECTION FINDING

[75] Inventor: Byungho P. Kwon, Chatsworth, Calif.

[73] Assignee: Hughes Aircraft Company, Los Angeles, Calif.

[21] Appl. No.: 54,177

[22] Filed: Apr. 30, 1993

[51] Int. Cl.$^6$ .................. G01S 7/40; G01S 7/41
[52] U.S. Cl. ............ 342/174; 342/90; 342/102; 342/157
[58] Field of Search ............... 342/90, 91, 92, 342/102, 155, 157, 158, 174, 151, 62, 172

[56] References Cited

U.S. PATENT DOCUMENTS

| | | | |
|---|---|---|---|
| 4,316,191 | 2/1982 | Sawatari et al. | 342/91 |
| 4,783,744 | 11/1988 | Yueh | 364/454 |
| 5,027,127 | 6/1991 | Shnitkin et al. | 342/372 |
| 5,056,051 | 10/1991 | Tkalcevic | 342/174 X |
| 5,063,529 | 11/1991 | Chapoton | 342/174 X |
| 5,068,597 | 11/1991 | Silverstein et al. | 342/192 X |
| 5,223,841 | 6/1993 | Ricker | 342/174 |

*Primary Examiner*—John B. Sotomayor
*Attorney, Agent, or Firm*—Charles D. Brown; Randall M. Heald; Wanda K. Denson-Low

[57] ABSTRACT

A method of estimating the directions of radiating sources (56, 58, 60) with respect to an array (46) of a number of antenna elements (48), each of which elements has a separate gain/phase control (50). With nominal gain and phase selected a first estimte of the radiating sources directions (θ) is accomplished by application of the MUSIC algorithm (2). The algorithm is iteratively applied to a microprocessor (54) using updated gain and phase values. Iteration is terminated at that iteration which produces the maximum difference values of the smallest eigenvalue pair of $Q_{(i)}$.

8 Claims, 4 Drawing Sheets

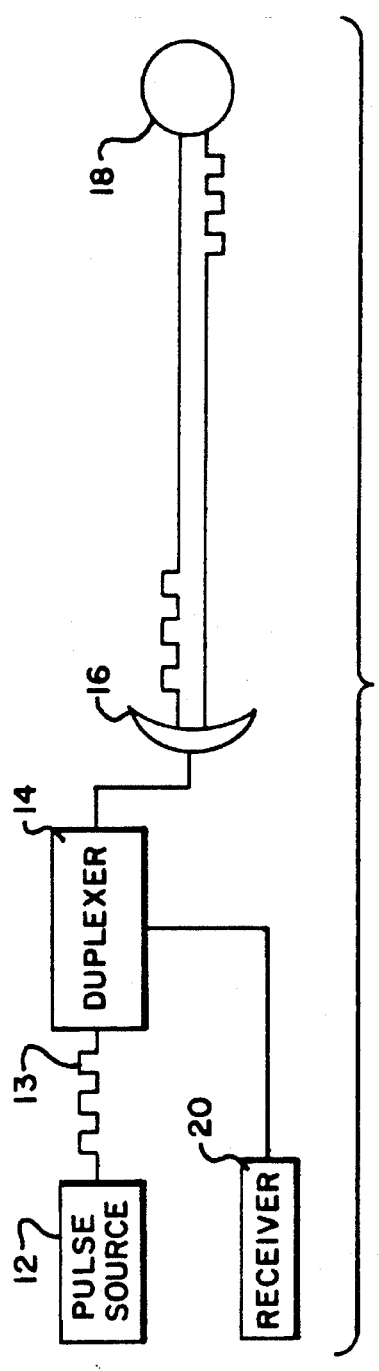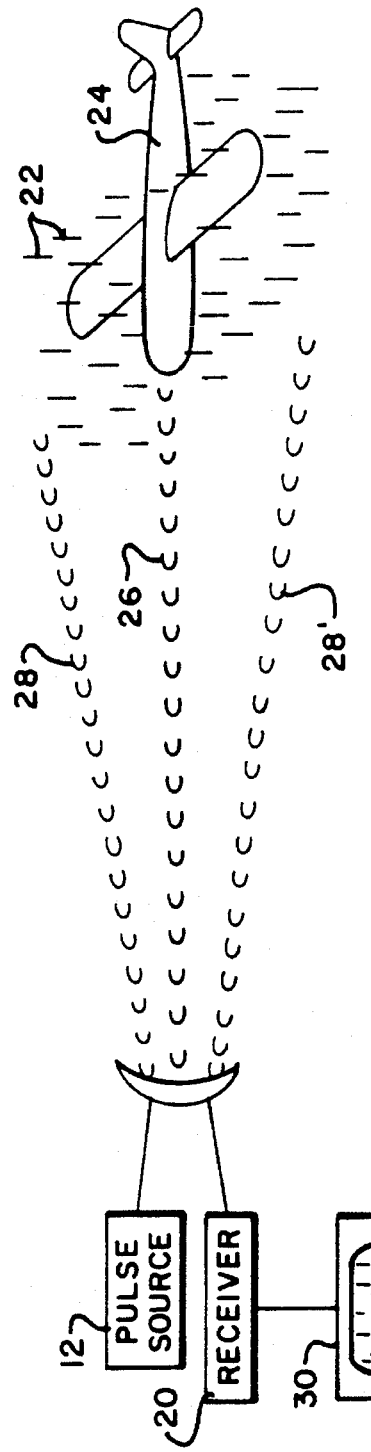
FIG. 1
FIG. 2A

SELF-CALIBRATING, EIGENSTRUCTURE BASED METHOD AND MEANS OF DIRECTION FINDING

BACKGROUND OF THE INVENTION

1. Field of the Invention

The present invention relates generally to a method and means of radar signal processing for direction finding purposes, and, more particularly, to such a method and means especially advantageous for use with a radar target seeker.

2. Discussion of Related Art

A radar seeker operates generally by emitting radar beam pulses toward a target, measuring the time traveled by pulses reflected from the target and adjusting the radar beam for maximum response, which enables both the direction and distance of the target to be determined.

In the usual situation, there may be other objects adjacent the sought after target which will produce radar reflections and, in that way, induce confusion and error into the tracking system. Also, in a military context defensive measures are taken to intentionally interfere with the operation and accuracy of a radar seeker aboard, say, an aircraft. For example, large quantities of radar reflecting foil strips ("window") dropped in the vicinity of a flying target aircraft can effectively block out radar detection of the craft. Another frequently employed radar camouflaging technique for an aircraft consists of having one or more escort craft flying near the target aircraft which direct "jamming" radar beams of appropriate frequency toward the search radar source to confuse and induce spurious direction information into the search tracking system.

Direction-finding techniques based upon eigenstructure methods have been proposed and experimentally verified and have shown themselves to be superior to conventional direction-finding equipment for overcoming standard defensive measures. Application of eigenstructure techniques requires a radar system having an active antenna array, that is, a plurality of antennae arranged in a matrix for sending and receiving radar pulses over a relatively large area including a sought after target and which antennae are controllable as to phase and gain.

A more detailed discussion of a prior eigenstructure method can be found in the article, "Eigenstructure Methods for Direction Finding with Sensor Gain and Phase Uncertainties" by Anthony J Weiss and Benjamin Friedlander, Proceedings IEEE, ICASSP 198, New York, N.Y. This technique requires at least two sources (i.e., two reflected radar signals) for proper operation which excludes applicability to a very frequently encountered situation, namely, a single-source encounter. Moreover, in this and in all known prior eigenstructure techniques precise knowledge of signals received by the sensor array is required which, in turn, requires initial calibration of the entire seeker data collection system, a time consuming and difficult task. Still further, there is the necessity for maintaining array calibration in these known systems which is additionally difficult and time consuming.

SUMMARY OF THE DISCLOSURE

It is a primary aim and object of the present invention to provide a radar direction finding means and method capable of satisfactory operation with radar return signals being imprecisely sensed as to both gain and phase.

Another object is the provision of means and method in accordance with the previous object by which a given target can be readily resolved from among relatively closely spaced multiple targets.

Yet another object is the provision in the above-identified objects of a method and means utilizing an active array radar seeker which does not require initial sensor array calibration or maintaining precise sensor calibration.

The described method includes receiving radiation from one or more radiating sources in a monitored region by the antenna array. With selected nominal gain and phase values for each antenna element of the array, a first estimate of directions of the radiating sources with respect to the array is calculated in a microprocessor by the use of an algorithm referred to as MUSIC. Updating of the gain and phase for each antenna element is accomplished by signals received by the array. Iterations of direction estimates are made based upon this and further updated gain and phase values until that iteration is reached which produces the maximum difference value of the smallest eigenvalue pair of $$Q = \sum_{i=1}^{M} \sigma_i v_i v_i^+.$$

BRIEF DESCRIPTION OF THE DRAWING

FIG. 1 is a schematic depiction of a conventional radar seeker;

FIGS. 2A and 2B show typical defensive techniques presently used against a radar seeker;

DESCRIPTION OF A PREFERRED EMBODIMENT

Figure 2B:
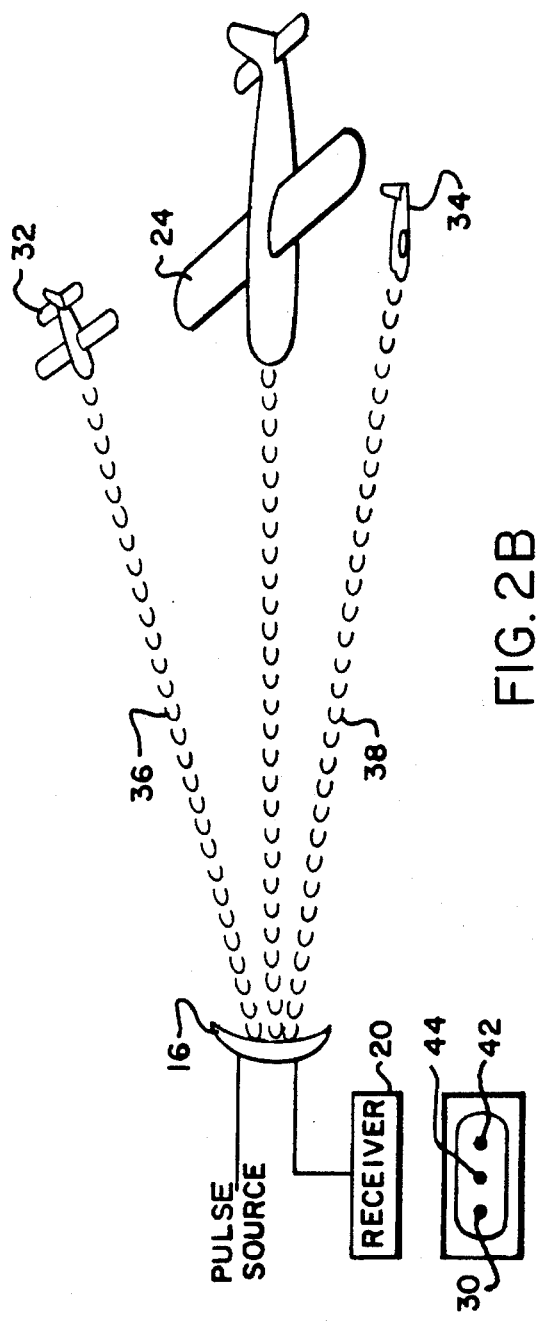
Figure 5:
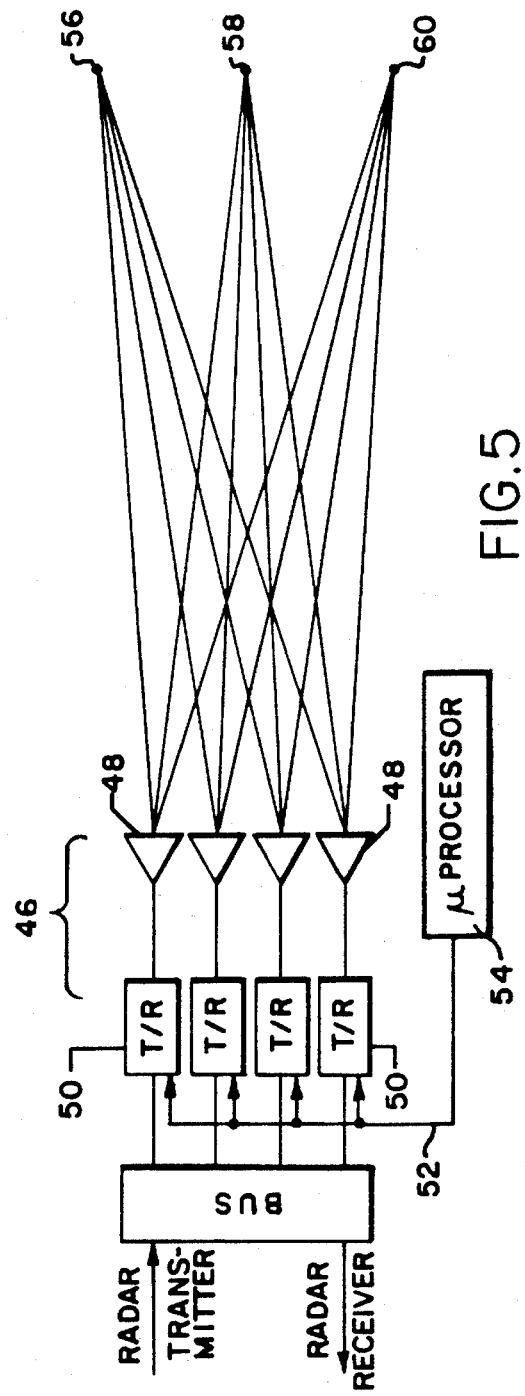
FIG. 5 is a schematic of a radar system for practicing the method of this invention.

With reference now to FIG. 1 of the drawing, a typical radar seeker system 10 is shown including generally a source 12 of high frequency pulses 13 which are fed through a so-called duplexer 14 to an antenna 16 where they are radiated toward a target 18. These pulses 13 are reflected off the target and return to the antenna 16. The duplexer 14 is essentially a switch that enables common use of one antenna for both transmitting and receiving reflected pulses which are then sent on to the receiver 20 for processing and display. By noting antenna orientation for maximum strength pulse reception and the time for pulse transmission, both the direction and distance to a target 18 can be determined.

FIG. 2A depicts the camouflaging effect that is produced when a large number of foil pieces 22 ("window") are released in the vicinity of a target aircraft 24. As shown, a plurality of pulse echoes are received from the target 24 as well as foil pieces 28, 28' which serves to hide or make it difficult to locate the target within the many false echoes produced by the individual pieces of foil as seen on a display 30, for example.

FIG. 2B depicts another defensive technique used against a seeker in which several target escort craft 32 and 34 each emit separate radar waves 36 and 38, respectively, directed toward the seeker antenna 16. These radar waves are of proper frequency and produce readily detectable signals 40 and 42 in the seeker receiver which can be easily confused with the echo signal 44 from the true target 24.

A seeker having a single element antenna or fixed array antenna, such as the antenna 16 in FIG. 1, merely receives all signals and echoes directed toward it and forwards the signals for processing and display. As has just been illustrated this can result in a composite set of signal displays resulting from both the actual target and other spurious targets located at a considerable spacing from the actual target and homing in on the wrong target. A seeker of this kind is not able to distinguish a very broad range of radar returns and separate defensive radar beams from true target returns.

Figure 3:
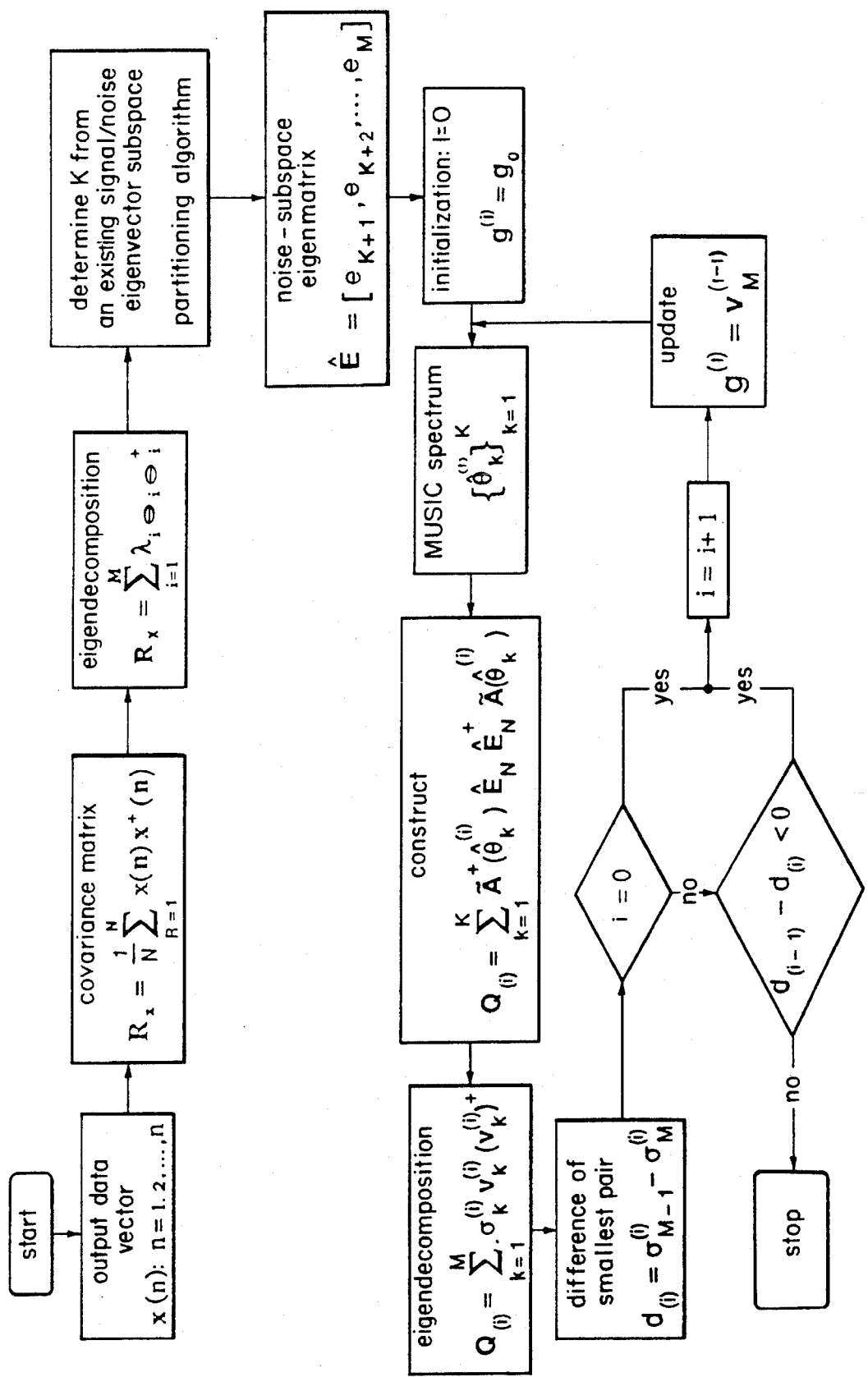
FIG. 3 is a function block flow diagram of the described method.

With reference now to FIG. 3, there is shown partially in schematic form an active antenna array enumerated generally as 46 which is especially useful with a seeker operating on an eigenstructure basis as the present invention does. More particularly, the active array is seen to include a plurality of individual antenna elements 48 with corresponding individual transmission and receive (T/R) controls 50 which can be controlled by lines 52 to detect or selectively modify the gain and phase of each of the antenna elements. A microprocessor 54 is appropriately programmed to cause the active array 46 to be selectively modified in a manner to be described to determine the actual target from among the various signal radiation sources 56, 58, 60—that the system may be receiving, including defensively produced radar beams, for example. Such an active antenna array is to be found more particularly described in copending patent application AN ACTIVE ANTENNA ARRAY, Ser. No. 08/047,937 by J. Conrad et al. assigned to the same assignee as the present application.

In the referenced Weiss et al. article an eigenstructure method is provided for direction finding in the presence of sensor gain and phase uncertainties. This method requires a minimum of two radiation sources for use (e.g., a target and one false echo) and, therefore, excludes applicability to single-source encounters which are a most frequent occurrence. Also, this method requires a subjectively preselected threshold to terminate iteration. This latter feature makes it difficult to optimize performance since in certain cases the process does not converge to the correct result. For example, in the situation where there are several closely spaced radiation sources and a low preselected threshold, the algorithm may not be resolvable.

Before proceeding with the description of the present invention, development of estimates by the so-called MUSIC algorithm for K observable radiating sources by an array of M antenna elements will be set forth and it is submitted will be of assistance in understanding the advantages of the invention. A detailed description of this technique can be found in PRIMARY SIGNAL PROCESSING, S.U. Pillai, Springer Verlag (1989). Initially, the M×1 output data vector of the array can be described by $x(t)=GAs(t)+n(t)$ where $G = \text{diag}[g_1, g_2, \ldots, g_m]$: M×M diagonal matrix $g_i$ ($\in$ complex): the unknown gain and phase of the i-th sensor $A = [a(\theta_1), a(\theta_2), \ldots, a(\theta_K)]$: M×K matrix with unknown $\theta_1, \theta_2, \ldots, \theta_k$ $a(\theta_k)$: M×1 direction vector of the k-th source $s(t)$: K×1 complex Gaussian signal vector with $E[s(t)]=0$; $E[s(t)s^+(t)]=R_s$ $n(t)$: M×1 complex Gaussian noise vector, independent of $s(t)$, with $E[n(t)]=0$; $E[n(t)n^+(t)]=\sigma^2 I$.

(The superscripts T and + represent the transpose and complex conjugate transpose, respectively and E[.] is the expectation operator.)

The covariance matrix of $x(t)$ is given by $$R_x = E[x(t)x^+(t)] = GAR_sA^+G^+ + \sigma^2 I = \sum_{i=1}^{M} \lambda_i e_i e_i^+$$

where $\lambda_i$, $e_i$; i=1, 2, ..., M are the eigenvalues and eigenvectors of $R_x$. With rank $(R_s)=K$ (i.e., K sources are not fully correlated), we have $$\left.\begin{array}{l} \text{i)} \quad \lambda_1 \geq \lambda_2 \geq \ldots \geq \lambda_k > \lambda_{k+1} = \ldots = \lambda_m = \sigma^2 \\ \text{ii)} \quad E_n^+ G a(\theta_k) = E_n^+ \tilde{A}(\theta_k) g = 0, k = 1, \ldots, K \end{array}\right\} \quad (1)$$

where $E_N=[e_{K+1}, \ldots, e_M]$ : M×(M-K) noise-subspace eigenmatrix $\tilde{A}(\theta_k)=\text{diag}(a(\theta_k))$ : M×M diagonal matrix with elements of $a(\theta_k)$ $g=[g_1, \ldots, g_m]^T$: M×1 vector.

The MUSIC spatial spectrum estimator, given by $$P_{MU}(\theta) = \frac{1}{\sum_{i=K+1}^{M} |e_i^+ Ga(\theta)|^2} = [g^+\tilde{A}^+(\theta)E_N E_N^+ \tilde{A}(\theta)g]^{-1}$$

produces the K-highest spectral peaks at the different angles of arrival $\theta_1, \theta_2, \ldots, \theta_k$ if the sensor gains and phases are known. In practice, however, we only know the sensor gains and phases approximately within some specified manufacturing-tolerance limits. As a consequence, the resolution performance of the MUSIC algorithm can be severely degraded and may not provide spectral peaks for all angles of arrival.

In order to substantially reduce the effects of sensor-channel gain and phase uncertainties, the method of this invention was developed arising out of the following theorem.

Given an error-free estimate of $\hat{E}_n$ (i.e., $\hat{E}_n = \hat{E}_N$) and $\{\theta_k\}_{k=1}^{K}$, define $$Q = \sum_{k=1}^{K} \tilde{A}^+(\theta_k) E_N E_N^+ \tilde{A}(\theta_k). \quad (3)$$

Then, there exists a unique g, where
ti $g = k\, v_m$, $k \in$ complex +tm (4)

and $v_M$ is the eigenvector corresponding to the smallest eigenvalue of Q, if rank $(Q)=M-1$.

($\Lambda$ represents the estimate from the finite-sample data vectors).

At this time it is believed presentation of a proof of the above theorem would be of assistance in understanding the invention. By the hermitian structure of Q and the orthogonality property stated in (1), we have $J=g^+Qg=0$ which implies rank $(Q)<M-1$.

Assuming that rank $(Q)=M'(<M-2)$ and $$Q = \sum_{i=1}^{M} \sigma_i v_i v_i^+$$

by eigendecomposition, then $$\sigma_1 < \sigma_2 > \ldots > \sigma_{M'} > \sigma_{M'+1} = \ldots = \sigma_M = 0$$

and g can be expressed as a linear combination of $v_{M'+1}$, $v_{M'+2}, \ldots, v_M$, i.e., $$g = \sum_{i=M'+1}^{M} k_1 v_1.$$

Thus, to have a unique solution for g, $M'=M-1$. The disclosed technique starts with nominal gain and phase values and estimate $\{\theta_k\}_{k=1}^{K}$ by MUSIC as discussed above. Then, with $\{\theta_k\}_{k=1}^{K}$, a new estimate of g is obtained by (3) and (4).

As initial condition for practice of the invention, set i=0 and $g^{(i)}=g_o$, where $g_o$ can be based on the nominal gains and phase values, or on any recent calibration data. In the usual situation, a nominal g is selected to be recent calibrated gain and phase values among "off-board" and "on-board" data. Then, by application of MUSIC, values for $\theta^{(i)}$, $\theta_2^{(i)}, \ldots \theta_k^{(i)}$, $$P(\theta|g^{(i)}) = \|\hat{E}_N^+ \tilde{A}(\theta) g^{(i)}\|^{-2}$$

Construct $$Q_{(i)} = \sum_{k=1}^{K} \tilde{A}^+(\hat{\theta}_k^{(i)}) \hat{E}_N \hat{E}_N^+ \tilde{A}(\hat{\theta}_k^{(i)}).$$

and compute $d_{(i)} = \sigma_{M-1}^{(i)} - \sigma_M^{(i)}$, whereby eigendecomposition $$Q_{(i)} = \sum_{k=1}^{K} \sigma_k^{(i)} v_k^{(i)} (v_k^{(i)})^+, (\sigma_1^{(i)} \geq \sigma_2^{(i)} \geq \ldots \geq \sigma_M^{(i)}).$$

If $d(i-1)-d_{(i)}<0$, then $i=i+1$ and you proceed by updating $g^{(i)}$ with the eigenvector corresponding to the smallest eigenvalue of $Q_{(i)}$, namely, $g^{(i)}=v_M^{(i)}$. Now, proceed to the step after initializing (i.e., providing $\theta_1^{(i)}, \ldots$ by MUSIC) and continue as just described. After a sufficient number of iterations are accomplished so that $d_{(i-1)}-d_{(i)}>0$, then the iteration cycle is terminated. In further explanation, it can be shown that for a unique g, rank $(\hat{Q})$ must be $(M-1)$. The difference in d values tells whether rank $(\hat{Q})$ is $(M-1)$ or not. If rank $(\hat{Q})<M-1$, the difference in d values is zero whereas the maximum value of the difference value insure that rank $(\hat{Q})$ is at least $M-1$. Accordingly, iteration continues until the indicated difference in d values reaches its maximum.

As to practical accomplishment of the method, with initial g selected from the most recent calibration gain and phase values and a set of measurements from an active array, the described algorithm proceeds in a microprocessor. At each iteration, the angle/gain/phase estimates are updated and utilized for the next iteration until the process is terminated. After termination, the calculated final angle estimates from MUSIC are utilized for the tracking system, and the final gain/phase estimates are applied to a new set of array measurements as the new on-board, calibrated data.

Figure 4A:
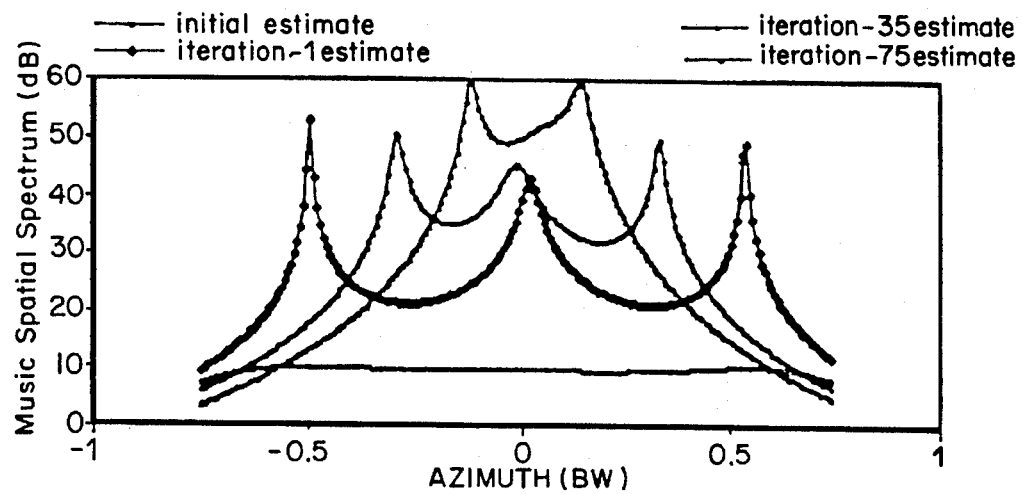
FIGS. 4A, 4B and 4C are graphs of results obtained in practicing the described method for three-source, two-source and one-source scenes, respectively.
Figure 4B:
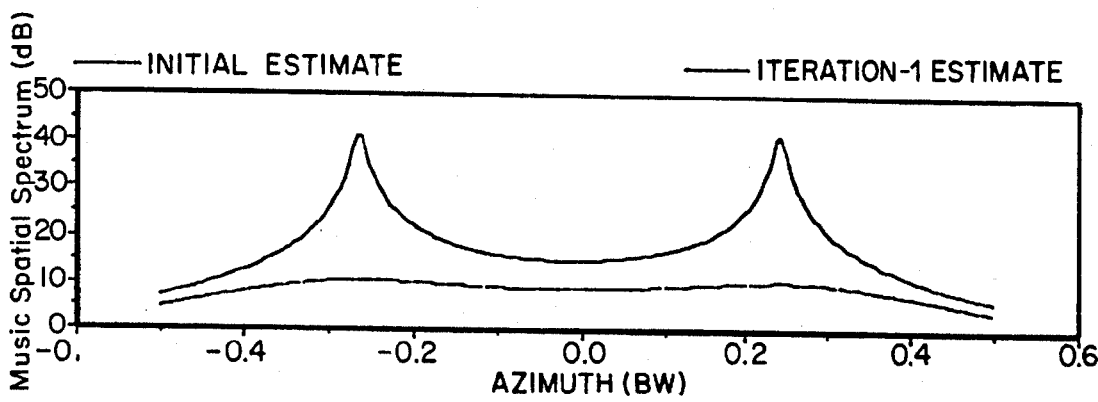
Figure 4C:
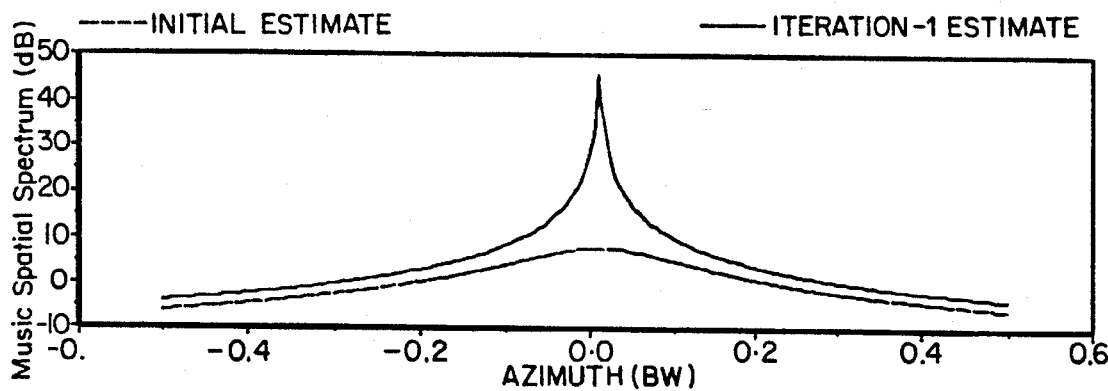

FIG. 3 depicts a flow block diagram of the described method of this invention. FIG. 4A shows the results obtained when the method of this invention is applied to a three-source scene. Similarly, FIG. 4B shows results obtained for a two-source scene, and FIG. 4C is a single-source scene.

As already alluded to, the present method can be applied to a single-source scene whereas the Weiss and Friedlander technique referenced earlier cannot, since that would require calculation of $Q^{-1}$. The advantage of a seeker being able to handle the single radiation source situation has already been discussed.

Although the invention has been described in connection with a preferred embodiment, it is to be understood that those skilled in the appertaining arts may make changes which come within the spirit of the disclosure and ambit of the appended claims.

What is claimed is:

1. A method of determining the individual directions of separate radiating sources in a region, comprising:
    directing a plurality of radiation sensing elements formed into an array toward the region;
    selecting initial nominal gain and phase values for the elements;
    measuring the individual element gain and phase values of radiation received from the radiating sources by the antenna array;
    calculating first estimation peaks of directions of arrival of radiation from the sources to the antenna array;
    updating the gain and phase values;
    iteratively calculating further estimation peaks of directions of radiation arrival from the sources based upon further updated gain and phase values; and
    terminating iterative estimation calculations.

2. A method as in claim 1, in which the selected nominal gain and phase values are recent calibrated values.

3. A method as in claim 1, in which the selected nominal gain and phase values are the final gain and phase value estimates of an immediately preceding determination of directions of radiating sources.

4. A method as in claim 1, in which updating in any iteration includes adopting the most recent gain and phase value measurements.

5. A method as in claim 1, in which estimates of K radiating sources directions are obtained by solution of the algorithm $P(\theta|g^{(i)}) = \|\hat{E}_N^+ \tilde{A}(\theta) g^{(i)}\|^{-2}$ and there are M sensing elements in the array.

6. A method as in claim 4, in which termination is determined by constructing $$Q_{(i)} = \sum_{k=1}^{K} \tilde{A}^+(\hat{\theta}_k^{(i)}) \hat{E}_N \hat{E}_N^+ \tilde{A}(\hat{\theta}_k^{(i)})$$

and terminating at the iteration which produces the maximum difference value of the smallest eigenvalue pair of $Q_{(i)}$.

7. Means for ascertaining respective directions of one or more radiating sources, comprising:
    an array including a plurality radiation sensors oriented to receive radiation from the sources;
    means interconnected with each of said radiation sensors for measuring gain and phase values; and
    a microprocessor interconnected with said measuring means and programmed to iteratively calculate estimation peaks of directions of radiation received from the source, construct $$Q_{(i)} = \sum_{k=1}^{K} \tilde{A}^+(\hat{\theta}_k^{(i)})\hat{E}_N\hat{E}_N^+\tilde{A}(\hat{\theta}_k^{(i)})$$

and terminate at the iteration which produces the maximum difference value of the smallest eigenvalue pair of $Q_{(i)}$.

8. Means as in claim 6, in which the estimated peaks for K radiating and an array of M sensors are obtained by solving $P(\theta|g^{(i)}) = \|\tilde{E}_N^+ \tilde{A}(\theta)g^{(i)}\|^{-2}$.

* * * * *